United States Patent

Watanabe et al.

[11] Patent Number: 5,109,462
[45] Date of Patent: Apr. 28, 1992

[54] LIGHT WAVELENGTH CONVERTER

[75] Inventors: Masanori Watanabe; Osamu Yamamoto; Toshihiko Yoshida, all of Nara, Japan

[73] Assignee: Sharp Kabushiki Kaisha, Japan

[21] Appl. No.: 577,651

[22] Filed: Sep. 5, 1990

[30] Foreign Application Priority Data

Sep. 7, 1989 [JP] Japan .................. 1-231975
Dec. 26, 1989 [JP] Japan .................. 1-339836

[51] Int. Cl.⁵ .................. G02B 6/26; G02F 1/37
[52] U.S. Cl. .................. 359/328; 385/32; 385/129; 385/122; 359/332
[58] Field of Search .............. 350/96.15, 96.12, 96.10, 350/96.34, 96.29; 307/425–430

[56] References Cited

U.S. PATENT DOCUMENTS

| | | | |
|---|---|---|---|
| 3,558,213 | 1/1971 | Marcatili | 350/96.12 |
| 4,015,217 | 3/1977 | Snitzer | 350/96.10 |
| 4,780,877 | 10/1988 | Snitzer | 350/96.34 X |
| 4,923,277 | 5/1990 | Okazaki et al. | 350/96.15 X |
| 4,972,422 | 11/1990 | Tatsuno | 350/96.12 X |
| 5,013,129 | 5/1991 | Harada et al. | 327/430 X |
| 5,029,976 | 7/1991 | Goto | 350/96.5 X |

OTHER PUBLICATIONS

T. Taniuchi et al., "Oyo Buturi", vol. 56, No. 12, pp. 1637–1641, 1987 (which is cited in the English text, p. 3, lines 21–22).

W. J. Kozlovsky et al., "IEEE Journal of Quantum Electronics", vol. 24, No. 6, pp. 913–919, 1988 (which is cited in the English text, p. 4, lines 12–13).

Primary Examiner—John D. Lee
Assistant Examiner—Phan T. Heartney
Attorney, Agent, or Firm—Nixon & Vanderhye

[57] ABSTRACT

A light wavelength converter which includes a light source for emitting fundamental waves having a desired wavelength, a first loop-shaped optical waveguide for converting the fundamental waves into harmonics, and a second optical waveguide for receiving the light from the source, wherein the two waveguides are coupled by an optical directional coupler.

14 Claims, 6 Drawing Sheets

FIG. 9 *(PRIOR ART)*

LIGHT WAVELENGTH CONVERTER

BACKGROUND OF THE INVENTION

1. Field of the invention

The present invention relates to a light wavelength converter used for information processors, such as an optical memory disc system or a laser beam printer, and optical measuring instruments where it is required to convert a wavelength of laser beams into a short wavelength zone.

2. Description of the prior art

An information processor, such as an optical memory disc system or a laser beam printer, and an optical measuring instrument use laser beams emitted from a semiconductor laser device that has a good quality in the focusing spot and directivity. In general, a laser beam emitted from a semiconductor laser device is a near infrared beam having an oscillation wavelength of 780 nm or 830 nm.

In recent years, in order to increase the amount of information to be processed in the information processors, or to enhance the measuring accuracy in the optical measuring instruments, short wavelength laser beams are required. In the information processor, the laser beam emitted from the semiconductor laser device is condensed at a predetermined place so as to write the information or images. The wavelength of the laser beam and the diameter of the focusing spot are usually proportional, so that, as the wavelength of a laser beam becomes shorter, the diameter of the focusing spot is reduced. As the diameter of the focusing spot is reduced, the amount of information (i.e., the recording density) to be written into the optical memory disc system is increased.

In the laser beam printer, the size of images to be printed can be reduced in proportion to the reduction in the wavelength of the laser beam, which means that the recording density is increased and that the resolution is increased. Moreover, if green and blue laser beams are easily obtained, a high speed and high resolution color printer can be achieved by combining a commonly used red laser beam. In optical measuring instruments, the measuring precision is enhanced by shortening the wavelength of the laser beam.

Recently, it is known that a semiconductor laser device using III-V semiconductor materials emits laser beams having oscillation wavelengths in the 600 nm level (for example, 680 nm), but so long as group III-V semiconductor materials are used, it is difficult to obtain laser beams having much shorter wavelengths. Therefore, efforts are made to develop semiconductor laser devices using ZnSe, ZnS and other group II-VI semiconductor materials, but at present even p-n junctions have not yet been realized. As is evident from this fact, no semiconductor laser devices capable of oscillating shortwave green and blue laser beams are available because of the unavailability of suitable materials. As a substitute, a large-scaled laser device such as an argon ion laser device and other gas lasers are used to obtain green, blue and other shortwave laser beams.

To solve this problem, methods for obtaining green and blue shortwave laser beams have been proposed without using large-scaled gas lasers but with the wavelength of laser beams oscillated by solid-state lasers and semiconductor laser devices. One method proposes sum frequency generation, that is, a plurality of optical frequencies are mixed to change the wavelengths of a laser beam. A typical example is the generation of second harmonics or third harmonics where two or three waves having the same frequency are mixed. Currently, by the second harmonic generating method, green laser beams with a wavelength of 0.53 $\mu$m are generated using a YAG (yttrium aluminum garnet) laser with a wavelength of 1.06 $\mu$m. Blue laser beams with a wavelength of 0.415-0.42 $\mu$m is also generated by using a semiconductor laser with a wavelength of 0.83-0.84 $\mu$m.

An example of the generation of second harmonics using semiconductor laser beams with a wavelength of 0.84 $\mu$m is reported in "Oyo Buturi" (vol. 56, No. 12, pages 1637-1641 (1987)). According to the report, an optical waveguide is formed on a LiNbO$_3$ substrate by a proton-exchange method so as to generate second harmonics with an optical output of 0.4 mW at a conversion efficiency of 1% by using semiconductor laser beams having a wavelength of 0.84 $\mu$m and an optical output of 40 mW. When the semiconductor laser beams are introduced into the optical waveguide, which is 2.0 $\mu$m wide and 0.4 $\mu$m deep, second harmonics are emanated into the substrate at an incline of approximately 16.2° thereto. At this point, the second harmonics and the fundamental waves are automatically phase-matched, thereby providing no restriction on the angle between the beam and the crystal and the temperature of the crystal. However, the output of the second harmonics, 0.4 mW, is too small to be utilized, for example, for an optical memory disc system which requires at least ten times this amount of output.

Since the wavelength conversion efficiency increases in proportion to the density of fundamental waves, the output of harmonics is proportional to the second power of the density of the fundamental waves. "IEEE Journal of Quantum Electronics" (vol. 24, No. 6, pages 913-919 (1988)) discloses a method of using an optical resonator in order to increase the density of fundamental waves. In the light wavelength converter proposed in this literature, as shown in FIG. 8, fundamental waves emanated from a YAG laser 91 are introduced into an MgO doped LiNbO$_3$ crystal 92 from one of the end faces. The crystal 92 is a non-linear optical crystal with the opposite end faces being precisely finished and coated with a reflecting film. The crystal 92 is placed in an oven 96, and heated to a predetermined temperature. The fundamental waves introduced into the LiNbO$_3$ crystal 92 reflect on the end and side faces thereof and circulate along the same optical paths with the crystal 92. Because of the reduced optical loss in the optical path of the fundamental waves, if the optical resonance conditions are satisfied, the intensity of the fundamental waves circulating along the optical paths amounts to be about ten times that of the incident light beams. The portion of the harmonics that is phase-matched with the fundamental waves is emitted from the end face of the crystal 92 opposite to one from which the fundamental waves are introduced, which is indicated by the broken lines in FIG. 8. The crystal 92 is sandwiched between a pair of electrodes 93a and 93b. A voltage is applied to the crystal 92 through the electrodes 93a and 93b, thereby controlling the optical resonance inside the crystal 92. The voltage applied between the electrodes 93a and 93b is controlled by the reflection of the fundamental waves on the end face of the crystal 92 when it receives the fundamental waves. More specifically, the reflected light received by a detecting device 94 is converted to a predetermined electric signal that is transmitted to a control circuit 95, where the voltage applied between the electrodes 93a and 93b is controlled so as to minimize the reflected light. In this way, with the use of the wavelength converter mentioned above, by inputting 52.6 mW YAG laser beams to the crystal 92, high harmonics having a large output of 29.7 mW is obtained with the conversion efficiency of 56%.

To put the above-mentioned light wavelength converter into practical use, there are problems:

First, both end faces of the non-linear optical crystal 92 must be carefully ground so as to achieve a desired delicate curvature and, then, be covered with a dielectric reflection film, which involves a difficult process. Second, it is difficult to satisfy the phase-matching conditions between the fundamental waves and the harmonics because of the susceptibility thereof to any disaccord in position between the incident light and the non-linear optical crystal. To achieve this, highly precise positioning between light and the non-linear optical crystal is required. Furthermore, in order to satisfy the phase-matching conditions, the non-linear optical crystal 92 must be strictly controlled to maintain a predetermined temperature (e.g., 107° C.), which, for example, requires that the crystal 92 be heated in the oven 96.

A practical light wavelength converter designed to overcome the above-discussed disadvantages uses a waveguide type optical resonator. The Inventors have proposed a light wavelength converter, where a waveguide functions as a loop-shaped optical resonator, impinging harmonics upon a substrate, which is disclosed in Japanese Patent Application No. 1-77823 (corresponding to copending commonly assigned U.S. patent application Ser. No. 07/498,573 filed Mar. 24, 1990 (now U.S. Pat. No. 5,046,802), naming Yamamoto et al as inventors). As shown in FIG. 9, this light wavelength converter comprises a loop-shaped optical waveguide 82 formed on a crystalline substrate 81 (e.g., Y-cut MgO doped LiNbO₃) producing non-linear optical effects. Laser beams (fundamental waves) generated from a laser beam source 84 are introduced to the optical waveguide 82 through an optical system 85 and are circulated in the optical waveguide 82. While the fundamental waves spread within the linear harmonics generating part 82a, they are converted into second harmonics A, which are emitted into the substrate 81 and output from an end face thereof. The fundamental waves spreading within a monitor wave generating part 82d, which is located opposite to the linear harmonics generating part 82a and roughly in parallel thereto, are converted into second harmonics B, which are emanated toward a detector 86 from the end face of the substrate 81 into which the fundamental waves are introduced. The detector 86 converts the received second harmonics B into a predetermined electric signal and sends it to a control circuit 87. The control circuit 87 controls a voltage applied to a pair of electrodes 83 and 83 placed on each side of an initial portion of the monitor wave generating part 82d in the optical waveguide 82, thereby changing the light wavelength of the fundamental waves spreading within the monitor wave generating part 82d, thus obtaining a maximum output of the second harmonics received from the detector 86 so as to satisfy the resonance conditions in the light waveguide 82. The fundamental waves which have passed through the monitor wave generating part 82d are returned to the harmonics generating part 82a through an non-symmetrical linked part 82f.

In the light wavelength converter of the previous invention, the fundamental waves are likely to cause a coupling loss of approximately 1.0 dB (20%) when they are returned to the harmonics generating part 82a through the non-symmetrical linked part 82f. If this loss is combined with a spreading loss of 10% or more occurring in other parts of the loop-shaped light waveguide 82, the three or more times amplification of the fundamental wave will be impossible.

Another disadvantage of the previous invention is that the fundamental waves converted into the second harmonics in the phase-adjusting method according to Cerenkov radiation, in which harmonics are generated from the whole area of the optical waveguide. Consequently, the shape of the irradiated beams of the harmonics are axially non-symmetrical. In this way the usable harmonics are limited to those generated in one direction from the optical waveguide in spite of being generated from the whole area of the optical waveguide with the remaining harmonics left unused, thereby reducing the utilization of the fundamental waves. In addition, the irradiation beams of the harmonics cannot be focused to the diffraction limit because they have no axially symmetrical shape, thereby limiting the range of application.

SUMMARY OF THE INVENTION

The light wavelength converter of this invention, which overcomes the above-discussed and numerous other disadvantages and deficiencies of the prior art, comprises a laser beam source for emanating fundamental waves with a predetermined wavelength, a loop-shaped main optical waveguide formed on a substrate adapted to allow fundamental waves to propagate and convert them into harmonics or sum waves under the phase-adjusting conditions, an incident optical waveguide for receiving the fundamental waves from said laser beam source and introducing them to said main optical waveguide, said incident optical waveguide having a part positioned in parallel to the part of said main optical waveguide, the two adjacent parts forming a directional optical coupler, through which the fundamental waves are propagated.

In one embodiment, the incident optical waveguide is linear without the two ends linked so that the fundamental waves propagating therein can be emitted outside the substrate.

In a preferred embodiment, the laser beam source is controlled by the fundamental waves emanated from said incident optical waveguide.

In another preferred embodiment, the incident optical waveguide has its two ends located on the same side face of the substrate and has curved parts so as to embrace said loop-shaped main optical waveguide.

In a still further preferred embodiment, each end of the incident optical waveguide is linked with an optical grating coupler.

In another preferred embodiment, a pair of electrodes are placed on each side of part of said main optical waveguide, between which electrodes a voltage is applied, thereby changing a refractive index for the fundamental waves.

In a further preferred embodiment, the voltage applied between said pair of electrodes is controlled by the fundamental light intensity emanated from the incident optical waveguide.

In a still further preferred embodiment, a part of said main optical waveguide forms a phaseadjusting part which adjusts a phase of the fundamental waves and generates harmonics or sum frequency waves, a part of said main optical waveguide further forming a directional optical coupler together with a part of an output optical waveguide so that said generated harmonics and sum frequency waves are transmitted to and propagate within said output optical waveguide.

In a preferred embodiment, the phase-adjusting part in said main optical waveguide is formed on a part of the substrate where a non-linear optical constant is inverted in the propagating direction of the fundamental waves.

Thus, in the light wavelength converter of this invention, the fundamental waves introduced in the incident optical waveguide formed on the substrate are transmitted, with a minimum loss, to the loop-shaped main optical waveguide through a directional optical coupler, thereby enabling a high amplification index of the fundamental waves propagating in the main optical waveguide to be obtained. As a result, the fundamental waves are effectively converted into harmonics or sum frequency waves, thereby obtaining a high output of harmonics or sum waves. In addition, the fundamental waves propagating in the main optical waveguide are free from wavelength conversion by Cerenkov radiation. The phase-adjusting conditions are approximately satisfied at the phase-adjusting part, and harmonics or sum frequency waves are generated. Thus, the fundamental waves can be effectively amplified and converted into harmonics or sum frequency waves, which can be emanated in a predetermined direction without being diversified.

BRIEF DESCRIPTION OF THE DRAWINGS

This invention may be better understood and its numerous advantages will become apparent to those skilled in the art by reference to the accompanying drawings as follows:

FIGS. 8 and 9 are brief views respectively showing conventional light wavelength converters.

DESCRIPTION OF PREFERRED EMBODIMENTS

Example 1

Figure 1:
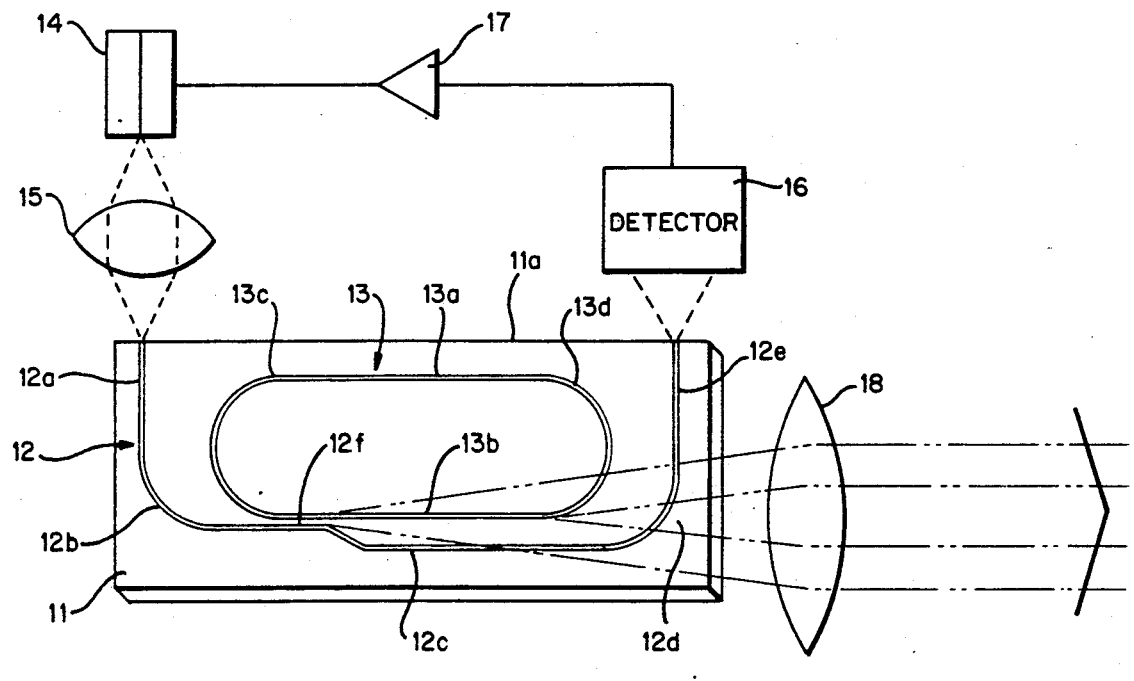
FIGS. 1 and 1a are plan views showing the first example of a light wavelength converter of the present invention.
Figure 1A:

Referring to FIg. 1, a light wavelength converter of this invention comprises a rectangular-shaped crystalline substrate 11 having a non-linear optical effect, an incident optical waveguide 12 formed on said substrate 11 and a loop-shaped main optical waveguide 13 formed on said substrate 11 separately from said incident optical waveguide 12. Said crystalline substrate 11 is made of, for example, Z-cut MgO doped $LiNbO_3$.

The loop-shaped main optical waveguide 12, which is formed in an oval shape extending along one length side face 11a of the substrate 11, comprises a pair of linear parts 13a and 13b, both running in parallel to said side face 11a of the substrate 11, positioned adjacent to and apart from said side face 11a respectively, and semicircle-shaped curved parts 13c and 13d linking each one end of said linear parts 13a and 13b. The incident optical waveguide 12 is formed in a U shape embracing the main optical waveguide 13. One end of the incident optical waveguide 12 is flush with the side face 11a of the substrate 11, continuing to an incident part 12a extending linearly in the vertical direction from the side face 11a. The incident part 12a is linked via an arc-shaped curved part 12b to a connecting part 12c which extends approximately perpendicular to said incident part 12a. The initial portion of said connecting part 12c adjacent to the curved part 12b runs closely in parallel to the linear part 13b of the loop-shaped main optical waveguid 13 located apart from the side face 11a of the substrate 11, for a predetermined length L at the end portion of the linear part 13b. This area of the two optical waveguides 12 and 13 closely running in parallel forms a directional optical coupler 12f where energy is gradually transmitted. Thus, the fundamental waves propagating within the incident optical waveguide 12 are gradually transmitted into the loop-shaped main waveguide 13. The other portion of the connecting part 12c than that forming the directional optical coupler 12f extends in parallel to the linear part 13b of the main waveguide 13 but with a wider distance between them than that at the directional optical coupler 12f. The connecting part 12c is linked via an arc-shaped curved part 12d to a linear output part 12e which extends in the vertical direction to the side face 11a of the substrate 11 with its other end being flush with said side face 11a.

Near one side of the length side face 11a where both ends of the incident optical waveguide 12 are located, an optical system 15 is disposed facing the end of the incident part 12a of the incident optical waveguide 12. Laser beams oscillated from a laser source 14 are focused to said end of the incident part 12a through the optical system 15. The laser beam (fundamental wave) thus introduced to the incident part 12a propagates in the incident optical waveguide 12. Near the opposite side of the length side face 11a of the substrate 11 is disposed a detector 16 facing the end of the output part 12e. The detector 16 receives laser beams emitted from said output part 12e after passing through the incident optical waveguide 12. The detector 16, then, sends an electric signal corresponding to the output of the received laser beams to a control circuit 17. Based on the signal sent from the detector 16, the control circuit 17 controls the output of laser beams oscillated from the laser source 14 so that the output of laser beams received by the detector 16 is minimized.

In the light wavelength converter of this configuration, laser beams oscillated from the laser beam source 14 are introduced as fundamental waves to the incident optical waveguide 12 on the substrate 11 through the optical system 15. Since the substrate 11 is made of a Z-cut $LiNbO_3$ crystal, the fundamental waves, while propagating within the connecting part 12c of the incident optical waveguide 12, are partly transmitted to the loop-shaped main optical waveguide 13 at the directional optical coupler 12f. At the directional optional coupler 12f, energy transmission is performed in a gradual way between the adjacent waveguides 12 and 13, ant therefore the fundamental waves transmitted from the first waveguide 12 to the second waveguide 13 are not subjected to an abrupt mode change, reducing the coupling loss to within several percent.

The fundamental waves propagating within the incident optical waveguide 12 but not transmitted to the main waveguide 13 at the directional optical coupler 12f is emitted from the end of the output part 12e of the incident optical waveguide 12 to be received by the detector 16. The detector 16 sends an electric signal corresponding to the output of the received light beams to the control circuit 17. The control circuit 17, then, by controlling the input current of the laser beam source 14, changes the oscillation wavelength so as to minimize the output of light beams received by the detector 16. The resonance conditions of the fundamental waves propagating within the main optical waveguide 13 are thus satisfied.

As described above, the fundamental waves transmitted to the main optical waveguide 13 satisfies the resonance conditions while passing therethrough and are emanated as harmonics to the substrate 11.

In this example, the harmonics emanating to the substrate 11 from the linear part 13b of the main waveguide 13 located apart from the length side face 11a of the substrate 11 is put out from an end face of the substrate 11 and converted into parallel beams through a lens 18.

In the light wavelength converter of this example where a Z-cut MgO doped LiNbO₃ substrate 11 is used, the optical waveguides 12 and 13 are formed, for example, by immersing into 220° C. phosphoric acid for 25 minutes to form a 0.4 μm deep proton-exchange layer. In this example, the width of the optical waveguides 12 and 13 was 1.0 μm each, the length of the linear parts 13a and 13b of the main optical waveguide 13 was 2.0 mm each and the curved parts 13c and 13d were made into an arc of a radius 0.5 mm each. As a result, the propagating loss index of the main optical waveguide was 0.8 dB/cm. In the proton-exchange optical waveguide, since the increase of the refractive index in the optical waveguides is as large as approximately 0.13, a curving loss at the curved parts 13c and 13d with a radius of curvature of 0.5 mm can be neglected, thus eliminating losses in the main optical waveguide 13 except the propagating loss. The suitable length of the directional optical coupler (the length of the area where the first and second optical waveguides run closely in parallel) was found between 20 to 2000 μm, and the suitable distance of the two waveguides was from 0.5 to 5.0 μm.

The length side face where each end of the incident part 12a and the output part 12e of the incident optical waveguide 12 is located and the end side face from which harmonics are emitted was optically ground and coated with a reflection protecting film suitable to a light wavelength passing through each side face. In this way, since the side face to which the fundamental waves are introduced and that from which the harmonics are emitted out are set differently, (1) the two side faces can be coated with a different reflection protecting film suitable to each wavelength, and (2) the fundamental waves not introduced into the incident optical waveguide 12 but directly emanated to the substrate 11 are not mixed to the harmonics.

In this example, to satisfy the resonance conditions of the fundamental waves propagating within the loop-shaped main optical waveguide 13, the wavelength of the semiconductor laser beam source 14 is changed by controlling the input current by the control circuit 17. In this method, however, unstable control may be observed due to mode hopping of the semiconductor laser device. This problem can be overcome by stabilizing the temperature of the semiconductor laser device. Or, an alternative method to satisfy the resonance conditions of the fundamental waves is, where the change of the wavelength of the laser beams is made by controlling the temperature of the semiconductor laser device while setting the current thereof as completely stable.

In the light wavelength converter thus obtained, when the output of the fundamental waves was 100, mW and the coupling output to the incident optical waveguide 12 was approximately 35 mW, the intensity of harmonics obtained after passing through the lens 18 was approximately 3 mW. From this result, the total output of harmonics generating from the main optical waveguide 13 is considered to reach approximately 10 mW.

The resonance conditions at the main optical waveguide 13 of this example are described in the form of the following equation, which is based on the assumption that no loss is observed in the directional optical coupler 12f:

$$\frac{P_4}{P_1} = \frac{\sin^2(\Delta/2)}{(1 - \cos(\Delta/2)t)^2 + 4t \cdot \cos(\Delta/2)\sin^2(\delta/2)},$$

wherein
 P₁ is an intensity of the fundamental waves introduced to the directional optical coupler 12f, and
 P₄ is an incident intensity of the fundamental waves transmitted to the main optical waveguide 13 as shown in FIG. 1:
 Δ is a constant proportional to the length L of the directional optical coupler, which is shown in the following equation, $$\Delta = (\beta e - \beta o)L,$$

wherein βe and βo are propagating consists of the directional optical coupler in the even and odd modes respectively. Incidentally, the complete coupling length Lc (the minimum length to allow the light to be completely transferred to the main optical waveguide when only the incident optical waveguide is excited) is obtained when $\Delta = +\pi$;
 t is a parameter indicating the amplitude of the light having circulated once the loop-shaped main optical waveguide, which is represented in the form of $(P_2/P_4)^{\frac{1}{2}}$, wherein P₂ is an intensity of the light having circulated once said waveguide:
 δ is a phase of the main optical waveguide (resonator) obtained in the following equation, $$\delta = (2\pi \cdot N \cdot h/\lambda) + (\beta o + \beta e) L/2,$$

wherein N is an effective refractive indes, h is a circumferential length of the loop-shaped main optical waveguide substrated by the length L and λ is a wavelength.

The optimal coupling condition where all of the incident beams introduced to the incident optical waveguide are transmitted to the main optical waveguide is obtained in the following equation, $$\cos(\Delta/2) = t.$$

Figure 2:
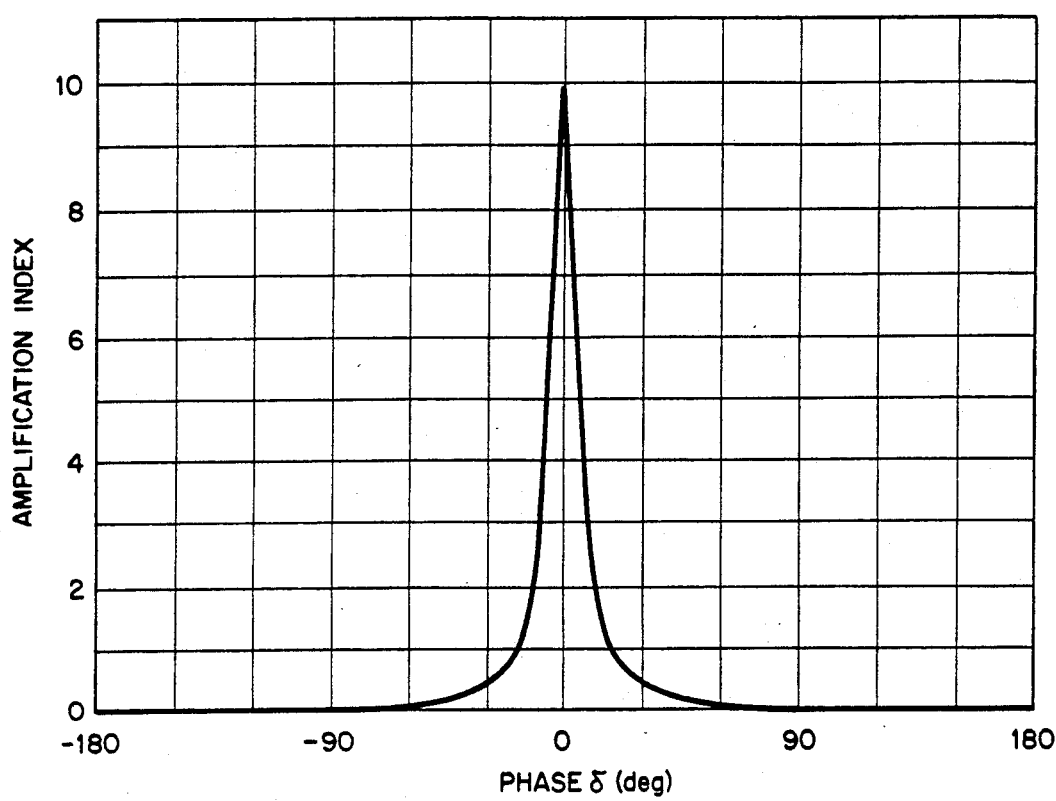
FIG. 2 is a graph showing the calculation result of the amplification index of the fundamental wave in the loop-shaped main optical waveguide when the phase thereof is controlled.

FIG. 2 shows the calculation result of the relation between the phase δ of the loop-shaped main optical waveguide and the amplification index of the fundamental wave. In the calculation, the loss of 10% at one circulation of light around the main optical waveguide was assumed. The graph indicates that the resonance conditions are satisfied when the phase δ is near 0°.

Figure 3:
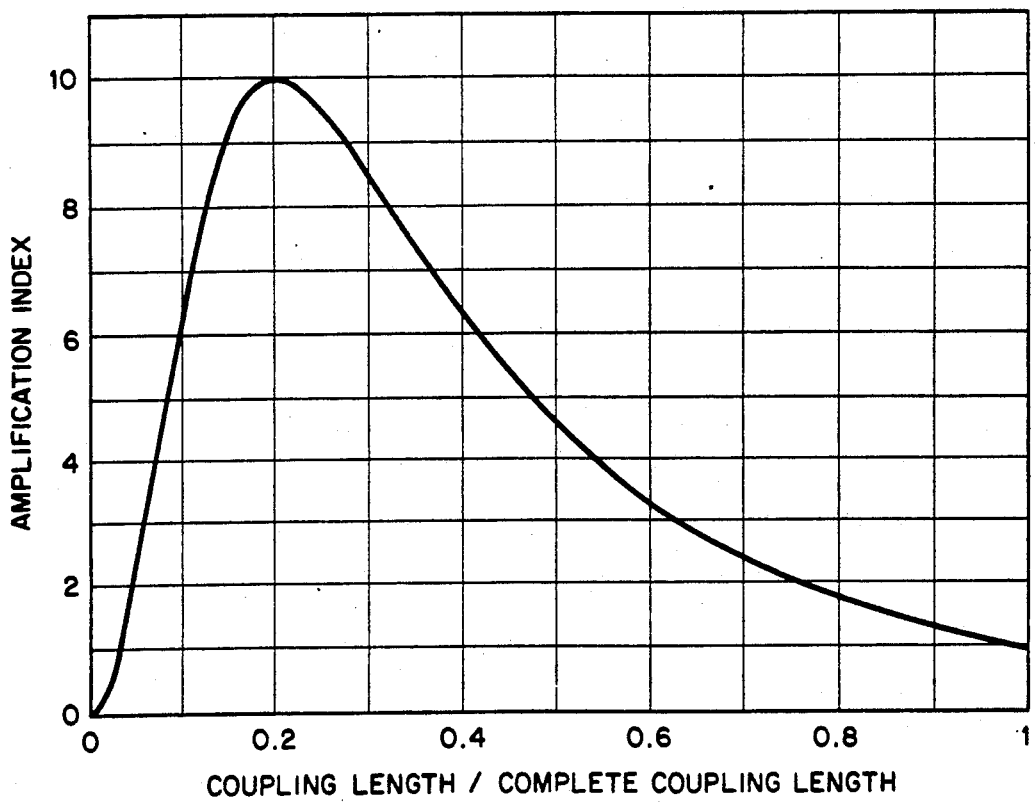
FIG. 3 is a graph showing the calculation result of the amplification index of the fundamental wave in the loop-shaped main optical waveguide when the length of the directional optical coupler is changed.

FIG. 3 shows the calculation result of the amplification index of the fundamental wave at the respective resonance conditions of optical waveguides. In the calcutlation, the loss of 10% at one circulation of light around the main optical waveguide was assumed. Given Lc as the complete coupling length, the minimum optimal coupling length is approximately 0.2 Lc. A shorter minimum optimal coupling length is possible when the loss in the loop-shaped main optical waveguide is reduced.

The laser light beam source may be a multi-mode semiconductor laser, not limited to a single mode one. In particular, when the interval of resonant wavelengths of the loop-shaped main optical waveguide (resonator) multiplied by an integer is equal to the interval of the longitudinal mode of the semiconductor laser, the output from the multi-mode semiconductor laser is mostly transmitted to the main optical waveguide, enabling highly efficient generation of second harmonics. In this case, in a strict sense, kinds of sum frequency waves are also generated, where semiconductor laser beams of different longitudinal mode frequencies are combined to generate harmonics.

Example 2

Figure 4:
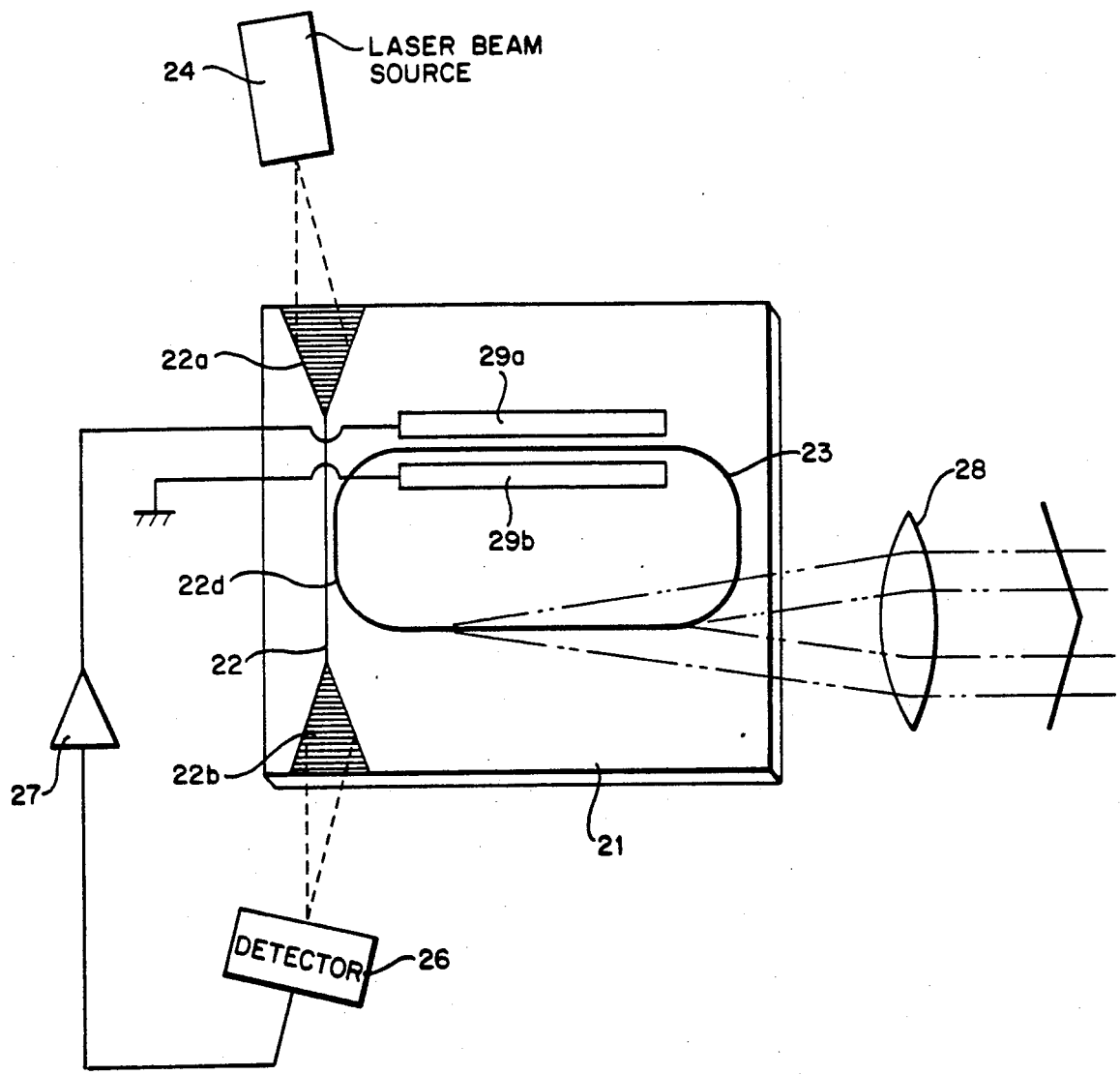
FIG. 4 is a plan view showing the second example of a light wavelength converter of the present invention.

FIG. 4 shows the second example of this invention. The light wavelength converter of this example comprises an oval-shaped loop main optical waveguide 23 formed on a Y-cut MgO doped LiNbO₃ substrate 21 and a linear-shaped incident optical waveguide 22 formed in one side of said main waveguide 23. One linear part of the main waveguide 23 has a pair of electrodes 29a and 29b placed on each side. These electrodes 29a and 29b, deposited on the substrate 21, apply a predetermined voltage to light beams propagating the linear part of the main optical waveguide 23.

The linear-shaped incident optical waveguide 22 runs closely to the main optical waveguide 23 in parallel for a predetermined length, forming a dairectional optical coupler 22d. The ends of the linear-shaped incident optical waveguide 22 are connected to grating couplers 22a and 22b formed on the substrate 21, respectively. One grating coupler 22a receives laser beams emitted from a YAG laser beam source 24 and transmits them to the incident optical waveguide 22. The other grating coupler 22b emanates the light beams having propagated through said incident optical waveguide 22, which are received by a detector 26 disposed against facing said grating coupler 22b. The detector 26 then sends an electrical signal corresponding to the output of the received light to a control circuit 27, which controls a voltage applied between the above-mentioned pair of electrodes 29a and 29b. The light beams passing through the part where the pair of the electrodes 29a and 29b is placed are subjected to a change of the refractive index according to an electrooptical effect caused by the voltage applied between the electrodes 29a and 29b, resulting in the phase adjustment so as to satisfy the resonance conditions. With the resonance conditions thus satisfied in the main optical waveguide 23, harmonics are emanated from said waveguide 23 to the substrate 21. The harmonics emanated from the other linear part of said waveguide 23 than the one having the electrodes 29a and 29b on each side are taken out and converted into parallel beams through a lens 28.

In this example, since a Y-cut LiNbO₃ substrate is used, the electrodes 29a and 29b can be formed directly on the substrate 21, not interposing a buffer layer. Also, in this example, since YAG laser beams are used as the fundamental waves, the depth of the first and second optical waveguides 22 and 23 is for example 0.55 μm, different from that for semiconductor laser beams. Furthermore, the fundamental waves are introduced to and emitted from the incident optical waveguide 22 by means of the grating couplers 22a and 22b respectively, not directly on side faces of the substrate, which means that grinding of the side faces of the substrate 21 is not required, thereby promising cost reduction and possibility of mass production.

In this example, when the output of the fundamental waves was 100 mW and the coupling output to the incident optical waveguide 22 was 15 mW, the intensity of harmonics obtained after passing through the lens 28 was approximately 1 mW.

EXAMPLE 3

Figure 5:
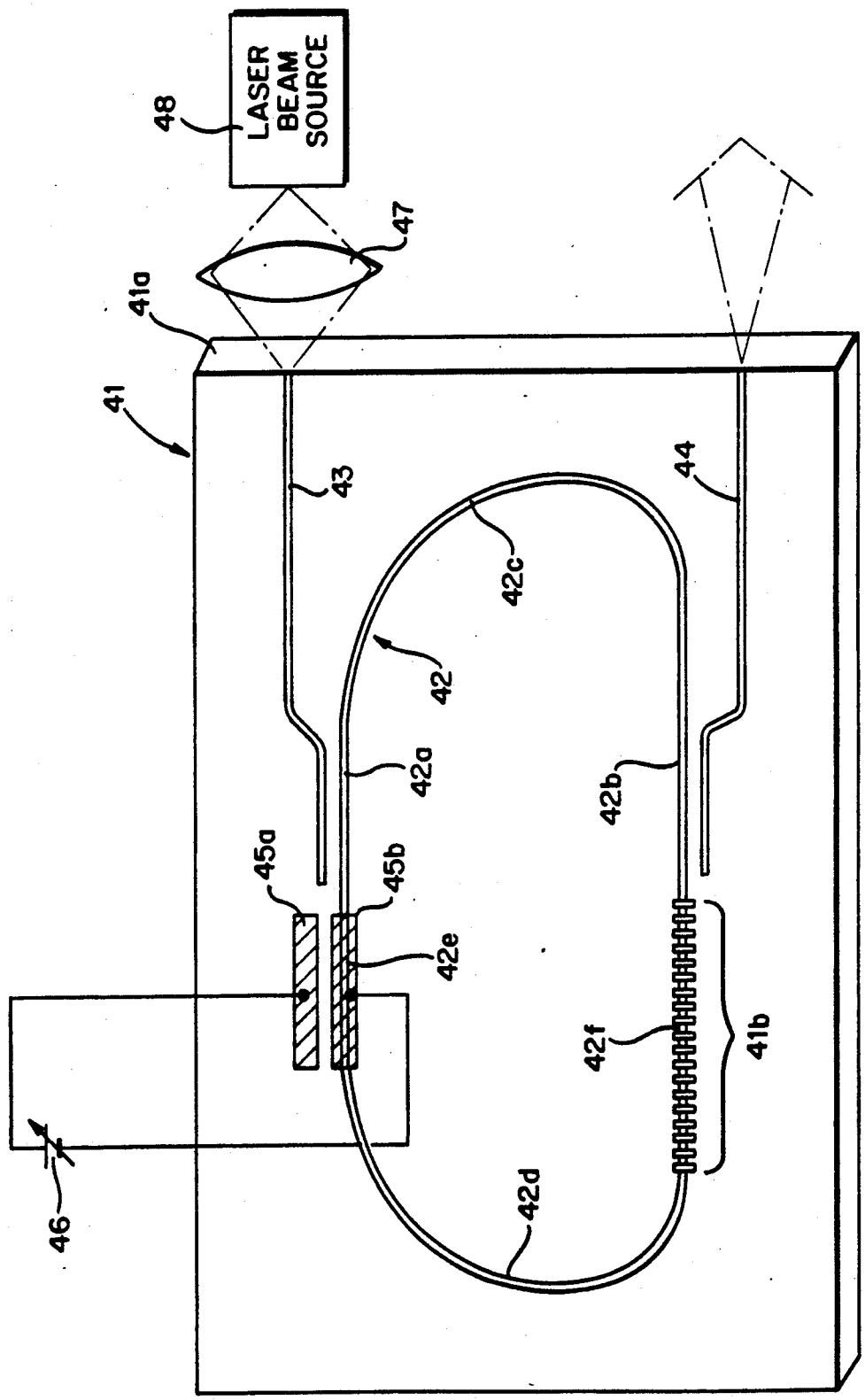
FIG. 5 is a plan view showing the third example of a light wavelength converter of the present invention.

FIG. 5 shows the third example of this invention. The light wavelength converter of this example comprises a rectangular-shaped crystalline substrate 41 with a non-linear optical effect and a loop-shaped main optical waveguide 42 formed on said substrate 41. The crystalline substrate 41 is made of, for example, a +Z-plate LiNbO₃ with large non-linear optical constants.

The oval-shaped main optical waveguide 42 formed on the substrate 41 includes a pair of linear incident-side and output-side coupling parts 42a and 42b extending in parallel along a length side of said substrate 41. On the substrate 41 are also formed an incident optical waveguide 43 with one end part running parallel to the incident-side coupling part 42a and an output optical waveguide 44 with one end part running parallel to the output-side coupling part 42b. The incident optical waveguide 43, after its end part adjacent to the incident-side coupling part 42a, deviates its route away from the main optical waveguide 42 and extends to an end face 41a of the substrate 41. Facing the end of the incident optical waveguide 43 is an optical system 47 positioned opposite one side of the end face 41a. Laser beams oscillated from a laser source 48 illuminate the end of the incident optical waveguide 43 through said optical system 47. The fundamental waves introduced in this way propagate within the incident optical waveguide 43.

The two adjacent parallel parts, the end part of the incident optical waveguide 43 and the incident-side coupling part 42a of the main optical waveguide 42, form a directional optical coupler, allowing the light beams passing through the incident optical waveguide 43 to be gradually transmitted to the main optical waveguide 42 through its incident-side coupling part 42a by means of optical coupling. The transmitted fundamental waves then propagate along the main optical waveguide 42.

The output optical waveguide 44 forms a symmetry with the incident optical waveguide 43 across the loop-shaped main optical waveguide 42. After its end part adjacent to the output-side coupling part 42b, the output optical waveguide 44 deviates its route away from the main optical waveguide 42 and extends to an end face 41a of the substrate 41.

The two adjacent parallel parts, the end part of the output optical waveguide 44 and the output-side coupling part 42b of the main optical waveguide 42, form a directional optical coupler, allowing the light beams passing through the main optical waveguide 42 to be gradually transmitted to the output optical waveguide 44 through the output-side coupling part 42b by means of optical coupling.

Each end of the incident-side and output-side coupling parts 42a and 42b near to the end face 41a of the substrate 41 is linked through a curved part 42c.

The other end of the incident-side coupling part 42a is followed by a linear control part 42e where a pair of electrodes 45a and 45b are placed to control the refractive index. Between the electrodes 45a and 45b is provided a power source 46 which supplies predetermined voltage between said two electrodes. Thus, the phase of the fundamental waves propagating within the main optical waveguide 42 is changed so as to satisfy the resonance conditions in said main optical waveguide 42 which works as a resonator.

The control part 42e of the main optical waveguide 42 is connected through a curved part 42d to a linear phase-adjusting part 42f which is linked to the output-side coupling part 42b. This phase-adjusting part 42f is placed on a corresponding non-linear optical constant inverting part 41b formed on the substrate 41 in order to approximately adjust the fundamental waves and the harmonics, where the non-linear optical constant on the substrate 41 is inverted at fixed intervals along the propagating direction of the fundamental waves by diffusing Ti over the corresponding area. As reported by E. J. Rim et al. in Electric Letters, vol. 25, No. 3, page 174, this non-linear optical constant inverting part 41b, which approximately adjusts the phases of the fundamental waves and the second harmonics, is formed, for example, in a manner that Ti in the pattern of stripes vertical to the phase-adjusting part 42f is deposited at fixed intervals in the direction of said phase-adjusting part 42f and then diffused at 1100° C. This causes inversion of crystal polarization at fixed intervals and therefore inversion of the non-linear optical constant. Thus, the fundamental waves propagating within the phase-adjusting part 42f of the main optical waveguide 42 are approximately phase-adjusted and converted into second harmonics. Incidentally, the non-linear optical constant may be inverted periodically at the part of the Ti diffused part corresponding to the phase-adjusting part 42f.

The optical waveguides 42, 43 and 44 on the substrate 41 are formed as described below. First, molybdenum (Mo) or other metal thin film for masking is deposited on the Z-cut LiNbO$_3$ crystalline substrate 41 with electron beam deposition. Next, the patterns corresponding to the three optical waveguides 42, 43 and 44 are formed with normal photolithography in association with the non-linear optical inverting part 41b formed by the before-mentioned Ti diffusion with a photoresist. Using this photo-resist pattern as a mask, the Mo or other metal film is etched and then subjected to a proton-exchange treatment in 200° pyrophosphoric acid.

Figure 6:
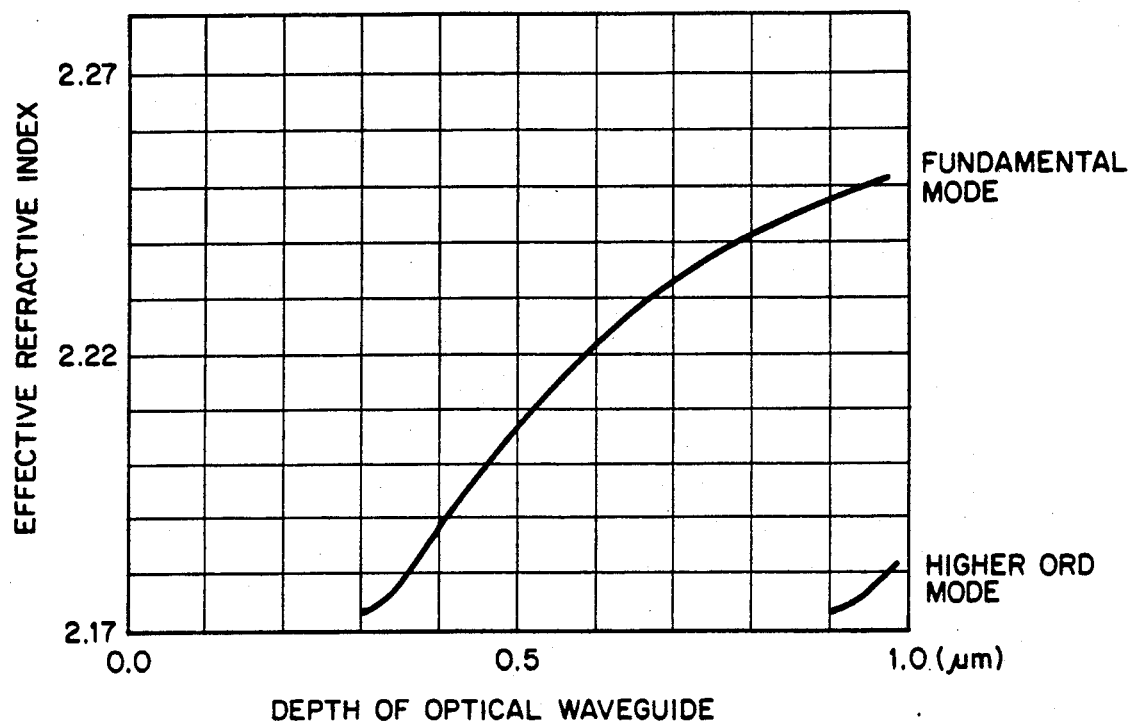
FIG. 6 is a graph showing the relation between the depth of the optical waveguide and the effective refractive index in the third example.
Figure 6:
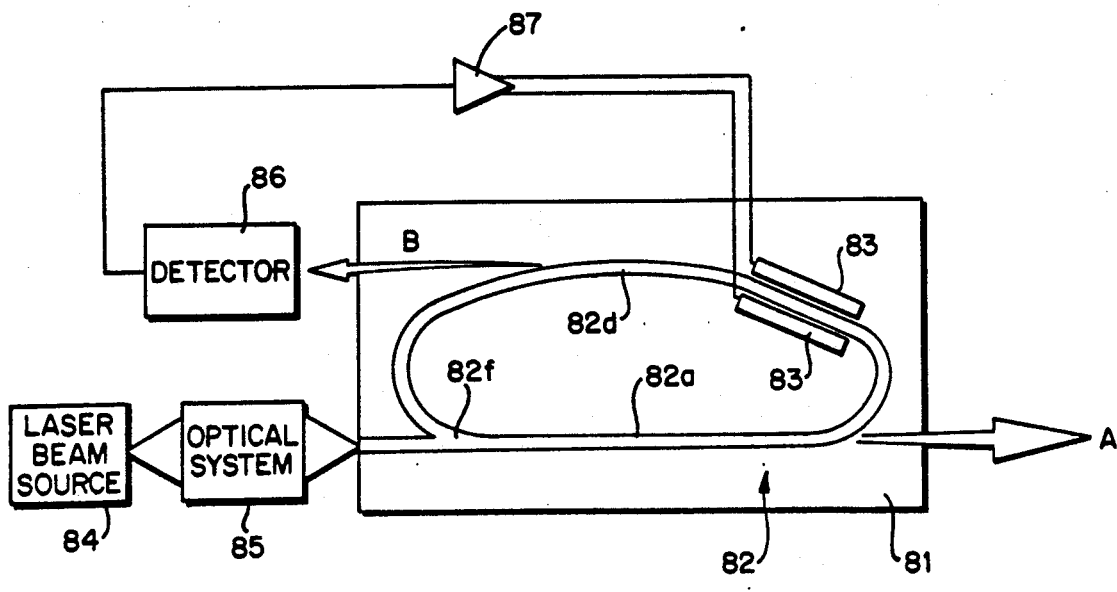

FIG. 6 shows an effective refractive index varying depending on the depth of the optical waveguides 42, 43 and 44 (dispersion curve), indicating that if the depth of the optical waveguides is set within 0.30 to 0.88 μm only a single mode of the fundamental waves is transmitted, thereby contributing to reducing the light loss and increasing the effect of light amplification.

It is known that, in the phase-adjusting method according to Cerenkov radiation, most of the fundamental waves which do not meet the depth range of 0.35 to 0.45 μm are not converted into the second harmonics. Using this feature, in this example, the depth of the optical waveguides is set to approximately 0.33 μm so that the fundamental waves in the main optical waveguide 42 are not converted into the second harmonics according to Cerenkov radiation but are subjected to the light amplification effect. Thus, the conversion to the second harmonics is only made by the approximate phase-adjusting between the fundamental waves and the second harmonics at the phase-adjusting part 42f of the main optical waveguide 42.

In the light wavelength converter of this configuration, the laser beams oscillated from the laser beam source 48 are introduced as fundamental waves into the incident optical waveguide 43 on the substrate 41 through the optical system 47. The fundamental waves thus introduced propagate in the incident optical waveguide 43 and are transmitted from the end part thereof to the incident-side coupling part 42a of the main optical waveguide 42 through the directional optical coupler formed with said two parts closely placed with respect to each other and in parallel. The transmitted fundamental waves then propagate in the main optical waveguide 42.

Since the incident optical waveguide 43 and the incident-side coupling part 42a of the main optical waveguide 42 are closely positioned, the light beams (fundamental waves) passing through the incident optical waveguide 43 are transmitted little by little to the main optical waveguide 42 so as not to cause an abrupt mode change, thereby greatly reducing the coupling loss.

As mentioned above, the fundamental wave passing through the main optical waveguide 42 is mostly free from the conversion to the second harmonics made according to Cerenkov radiation.

The fundamental wave passing through the main optical waveguide 42 receives a predetermined voltage applied between the electrodes 45a and 45b at the control part 42e and the refractive index is controlled according to the electrooptical effect, thereby satisfying the resonance conditions and being amplified. Then, the fundamental waves, while passing through the phase-adjusting part 42f, receive approximate phase-adjustment and are consequently converted into the second harmonics by the influence of the non-linear optical constant inverting part 41b on the substrate 41. The second harmonics generated at the phase-adjusting part 42f are transmitted from the output-side coupling part 42b to the end part of the output optical waveguide 44 through the directional optical coupler formed with said two parts closely placed in parallel to each other. The transmitted harmonics are then emitted from the other end of the output optical waveguide 44 located on the end face 41a of the substrate 41.

In this example, semiconductor laser beams with the wavelength of 830 nm and the output of approximately 3 mW were introduced from the end of the incident optical waveguide 43 located on the end face 41a of the substrate 41. The fundamental wave transmitted to the main optical waveguide 42 was amplified with a voltage applied between the electrodes 45a and 45b by the control of the refractive index. At the phase-adjusting part 42f, blue laser beams with a wavelength of 415 nm were generated by the conversion through the non-linear optical constant inverting part 41b. These blue laser beams were then transmitted to the output optical waveguide 44 and emanated from the end thereof located on the end face 41a of the substrate 41. The output blue laser beams diverged in an oval shape having a larger angle in the vertical direction to the substrate 41 than that in the horizontal direction thereto, but was able to be converged to the maximum within the diffraction limit.

In this example, both the introduction of the fundamental wave to the incident optical waveguide 43 and the output of second harmonics from the output optical waveguide 44 are performed on the same end face 41a of the substrate 41. However, prism optical couplers or diffraction gratings can be used for these purposes.

Figure 7:
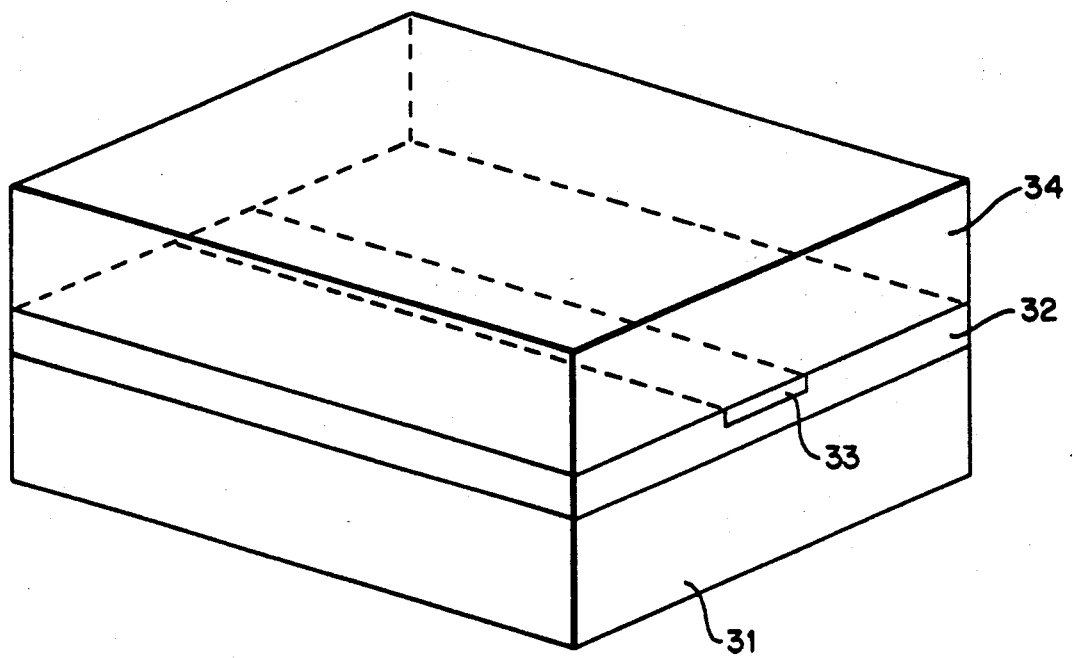
FIG. 7 is a view to describe the structure of the optical waveguide in the fourth example of this invention.
Figure 8:
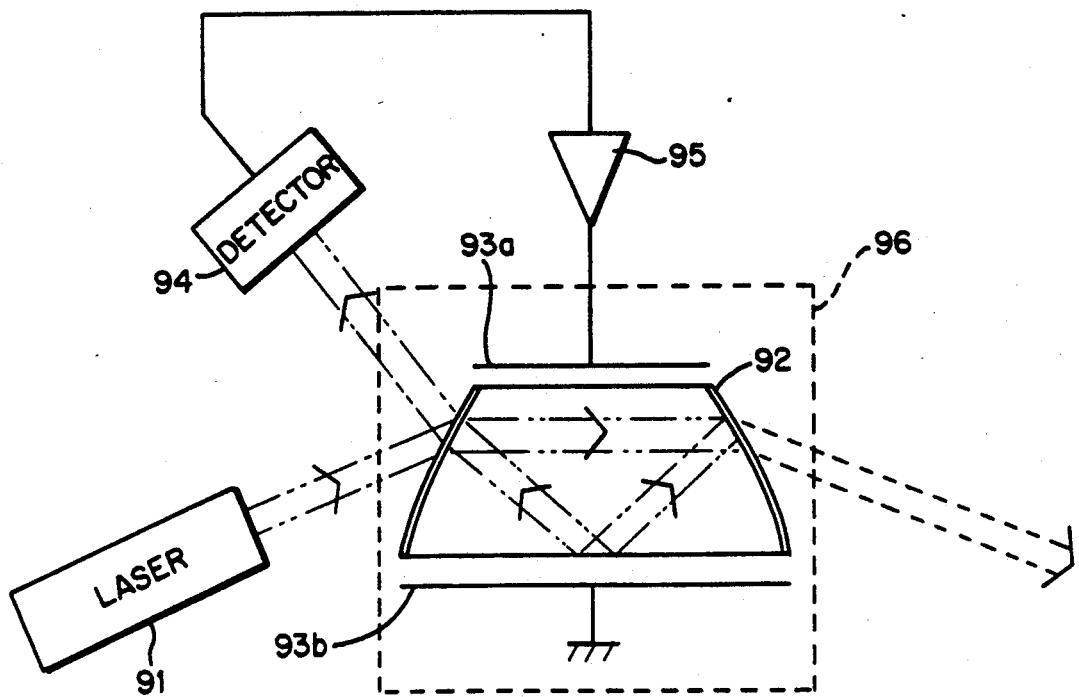

As the material for main and incident optical waveguides, an organic material having the non-linear optical effect can be used. FIG. 7 is a perspective view showing the structure of an optical waveguide using MNA (2-methyl-4-nitroaniline) with the large non-linear optical effect as a material for the waveguide. On a glass substrate 31 is laminated a thin MNA layer 32 approximately 1-10 μm thick, with a ZnO thin film layer 33 intruded thereinto as illustrated in FIG. 7. Then the ZnO thin film layer 33 and the MNA layer 32 are covered with a glass substrate 34. The ZnO thin film layer 33 forms a first or main optical waveguide in a similar shape to, for example, the incident optical waveguide 12 or the main optical waveguide 13 in FIG. 1. In the structure illustrated in FIG. 7, fundamental waves propagate along the ZnO thin film layer 33 while the MNA layer 32 having the non-linear optical effect works as a clad layer. The satisfaction of the resonance conditions depends on the relation of the refractive index between the ZnO thin film layer 33 and the MNA layer 32.

The optical waveguide described above is formed in the following manner. One glass substrate 34 on which the ZnO thin film layer 33 is laminated is placed facing the other glass substrate 31, keeping a predetermined width of space therebetween. Into the space is injected liquid MNA with a temperature above the melting point, which is then cooled to the solid state.

In this example, YAG laser beams are used as fundamental waves, and control of the fundamental waves with an electrooptical effect is not available due to the nature of the material used. In this case, it is possible to generate second harmonics by adjusting the whole temperature so as to utilize the change of the optical path length liable to that of the refractive index with temperature. Since the MNA has a large non-linear optical constant, the generation of second harmonics with excellent efficiency is achieved by reducing the loss within the waveguide and improving the orientation of MNA.

Non-linear materials used for the optical wavelength converters in the above-described examples can be those that satisfy the condition of radiating harmonics to a substrate (Cerenkov radiation), including non-organic materials such as $LiNbO_3$, $KNbO_3$, $\beta$-$BaB_2O_4$, BNN ($Ba_2NaNb_5O_{15}$), KDP ($KH_2PO_4$), KTP ($KTiOPO_4$) and KTA ($KTiOA_sO_4$) and organic materials such as MNA, MAP (3-methyl 2, 4-dinitrophenylaminopropanate), m-NA (metanitroaniline), LAP (L-algininphosphatemonohydrate), DLAP (deuterated LAP), urea and so on. These non-linear optical materials can be used directly as a substrate or can be layered on a substrate made of glass, sapphire, MgO, silicon, GaAs and the like.

The laser light beam source may be a multi-mode semiconductor laser, not limited to a single mode one. In particular, when the interval of resonant wavelengths of the loop-shaped main optical waveguide (resonator) multiplied by an integer equals to the interval of the longitudinal mode of the semiconductor laser, the output from the multi-mode semiconductor laser is mostly transmitted to the main optical waveguide, enabling efficient generation of second harmonics. In this case, in a strict sense, kinds of sum frequency waves are also generated, where semiconductor laser beams of different longitudinal mode frequencies are combined to generate harmonics.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A light wavelength converter comprising:
    a laser beam source for emanating fundamental waves with a predetermined wavelength,
    a loop-shaped main optical waveguide formed on a substrate so as to propagate fundamental waves and convert them into harmonic frequency waves under phase-adjusting conditions,
    an incident optical waveguide for receiving the fundamental waves from said laser beam source and introducing them to said loop-shaped main optical waveguide, said incident optical waveguide having a linear part positioned adjacent and in parallel to a part of said loop-shaped main optical waveguide, both adjacent linear parts forming a directional optical coupler through which the fundamental waves are propagated.

2. A light wavelength converter according to claim 1, wherein said incident optical waveguide has an outlet so as to emit the fundamental waves propagating therein outside the substrate.

3. A light wavelength converter according to claim 2, wherein said laser beam source is controlled according to the fundamental waves emitted from said incident optical waveguide.

4. A light wavelength converter according to claim 2, wherein said incident optical waveguide has its two ends located on the same side face of the substrate and has curved parts so as to embrace said loop-shaped main optical waveguide.

5. A light wavelength converter according to claim 2, wherein a part of said incident optical waveguide is formed in parallel to a part of said loop-shaped main optical waveguide, the two adjacent linear parts fomrring a directional optical coupler.

6. A light wavelength converter according to claim 5, wherein each end of said incident optical waveguide is linked with an optical grating coupler.

7. A light wavelength converter according to claim 5, wherein a pair of electrodes are placed on each side of part of said main optical waveguide, between which electrodes a voltage is applied, thereby changing a refractive index of the main waveguide and so changing the phase of the fundamental waves.

8. A light wavelength converter according to claim 7, wherein the voltage applied between said pair of electrodes is controlled according to the fundamental waves emitted froom the incident optical waveguide.

9. A light wavelength converter according to claim 1, wherein a part of said loop-shaped main optical waveguide forms a phase-adjusting part which adjusts the phase between the fundamental wave and second harmonic frequency waves so as to convert the fundamental waves to harmonic frequency waves, together with a part of an output optical waveguide so that said generated harmonic waves are transmitted to and propagate within said output optical waveguide.

10. A light wavelength converter according to claim 9, wherein said phase-adjusting part in said main optical waveguide is formed on a part of the substrate where a non-linear optical constant is periodically inverted in the propagating direction of the fundamental waves.

11. A light wavelength converter comprising:
a substrate of non-linear optical material;
an endless closed loop optical waveguide formed in a surface of the substrate and providing an optically resonant self-reentrant transmission path for recirculating optical signals of a first wavelength;
said substrate converting a portion of said optical signals of a first wavelength to optical signals of harmonic wavelength for each recirculation thereof; and
an input optical waveguide passing in proximity to a portion of said endless closed loop optical waveguide to directionally couple input optical signals of said first wavelength passing therealong into said endless closed loop optical waveguide.

12. A light wavelength converter as in claim 11 further comprising:
an optical signal source coupled to pass optical signals of controlled wavelength into said input optical waveguide; and
closed loop control means for controlling the optical signal source to produce optical signals of said first wavelength in response to the detected efficiency with which optical signals are being coupled into said endless closed loop optical waveguide and converted into harmonic wavelength optical signals.

13. A light wavelength converter as in claim 11 further comprising:
an optical signal source coupled to pass optical signals into said input optical waveguide; and
control means for controlling the self-resonant first wavelength of the endless closed loop optical waveguide to substantially equal the wavelength of optical signals produced by said optical signal source.

14. A light wavelength converter as in claim 13 wherein said control means is part of closed control loop responsive to the efficiency with which optical signals from the signal source are coupled into said endless closed loop optical waveguide and converted into harmonic wavelength output signals.

* * * * *